Patented Apr. 18, 1933

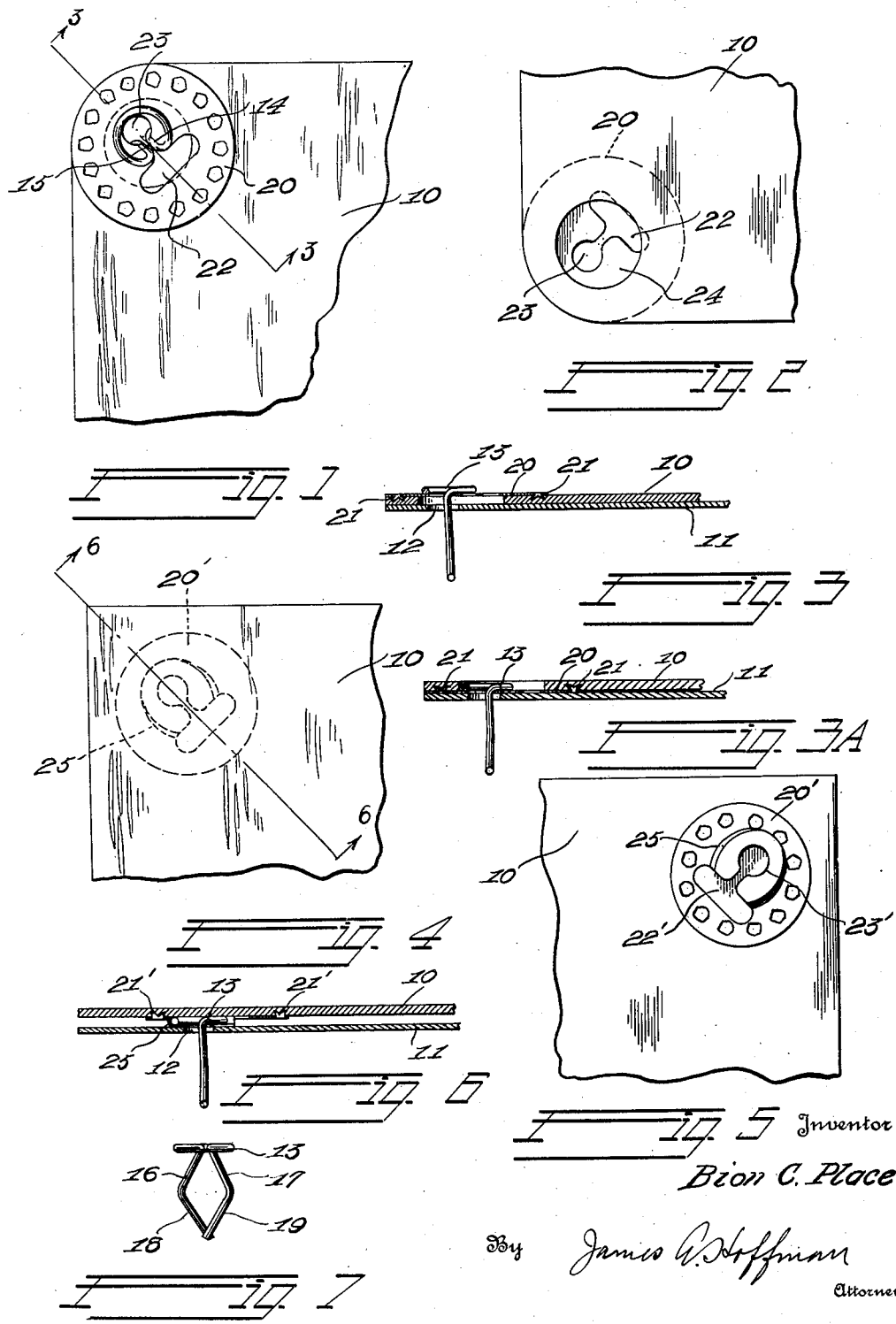

1,904,077

UNITED STATES PATENT OFFICE

BION C. PLACE, OF DETROIT, MICHIGAN, ASSIGNOR OF ONE-HALF TO GEORGE E. GAGNIER, OF DETROIT, MICHIGAN

SECURING TRIM PANELS

Application filed July 20, 1928. Serial No. 294,125.

This invention relates to an improved arrangement for securing a fastener to a fibrous or similar panel. The invention is especially designed for use in connection with the attachment of a fibrous panel to a perforated supporting structure, of plate-like or other form, that is so positioned that only one face of the supporting structure is readily accessible. The invention is particularly intended for use in securing trim panels constituting a part of the interior finish of automobile bodies to the metallic interior portions of said bodies, though the invention is capable of use in many other relations in which it is desirable to secure a fastener to a panel of fibrous or similar material in such a way that the fastener is invisible or so that the fastener may be securely held in assembled relation to the panel by a more rigid means than would be provided by the direct assembly of the fastener and the fibrous panel.

The primary object of the invention is to provide an arrangement for securing a fastener to a trim or similar panel by means of a metallic plate, that is so constructed that it may be produced at a very low cost and may be applied to the panel in an extremely simple manner, while at the same time providing a firm and practical means for anchoring the fastener with respect to the panel.

A further object of the invention is to provide a novel sheet metal member of a plate-like form that may be stamped out of sheet metal and simultaneously provided with prongs that permit of its ready attachment to a fibrous or similar panel in a single operation.

A still further object of the invention lies in the provision of a plate-like metallic member that is provided with integral projections of a form suitable to secure the member firmly to the panel by causing said integral portions of the plate-like member to bite into the fibrous material without penetrating through to the face of the material opposite to that on which the plate-like member is applied.

A still further object of the invention is to provide a metallic member to serve as an anchorage for a fastener, designed to hold a fibrous panel in assembled relation to a suitable supporting structure, in which the plate-like member is provided with an opening formed to permit the ready assembly of the fastener and plate-like member and in which said member is provided with integral attaching means that enable it to be firmly attached to the fibrous panel around an opening that may be of a form and size substantially different from the opening in said plate-like member that is designed to receive the fastener and hold it in proper assembled relation with respect thereto.

A still further object of the invention lies in the provision of a plate-like fastener anchoring member that may be readily attached to the undersurface of a perforated panel around the edges of the perforation, the plate-like member being provided with an opening or slot that permits the ready assembly of the fastener with respect to said member from the rear face of the panel so that when the fastener is assembled with respect to said member the head thereof is disposed in the opening provided in the body of the panel, whereby a construction in which the fastener does not project beyond the outer surface of the panel is provided.

A still further object of the invention is provide a fastener attaching member of such form that it may be applied at any portion of the panel either close to, or remote from the edges thereof, with equal facility, and that is provided with a fastener anchoring means of such form that it may conveniently receive a headed fastener of any type.

A still further object of the invention is to provide a fastener anchoring plate or member that may be firmly applied to a fibrous panel in an extremely expeditious manner by simply forcing a portion of the body of the plate to bite into the fibrous material, which plate serves to strengthen the panel where it is applied, and at the same time serves to provide a reinforcement at the point of the panel at which the panel securing fastener is applied, thus strengthening the panel at the point at which strength is most urgently required.

Still further objects of the invention will appear as a description thereof proceeds with reference to the accompanying drawing in which:

Fig. 1 is a view of a fragment of a panel of fibrous or similar material showing the improved plate-like fastener anchoring member applied to the front or exposed face thereof adjacent a corner, a preferred form of fastener being shown in assembled relation to said plate.

Fig. 2 is a rear view of the construction appearing in Fig. 1, the fastener being removed.

Fig. 3 is a sectional view taken on the plane indicated by the line 3—3 on Fig. 1.

Fig. 3A is a sectional view similar to that shown in Fig. 3 but showing the panel reversed from the position in which it appears in Fig. 1.

Fig. 4 is a face view of a fragment of a panel having a modified form of fastener anchoring plate or member secured to the rear face thereof.

Fig. 5 shows the rear face of the panel shown in Fig. 4.

Fig. 6 is a sectional view taken on the plane indicated by the line 6—6 of Fig. 4.

Fig. 7 is a side elevation of a preferred form of fastener that may be anchored with respect to the panel by the plate-like anchoring member constituting the subject matter of this application.

Like reference characters indicate like parts throughout the several views.

The numeral 10 indicates a panel of cardboard, fibre board or similar fibrous material. Such panels are applied ordinarily to the interior of portions of automobile bodies, such as the doors, for example, and this invention is particularly adapted for use in securing panels of the construction just stated for this purpose. As is well known the panels are secured to the inner surfaces of metallic structural elements of the automobile and said panels must be applied thereto from one face of said elements, in view of the fact that the rear face is inaccessible for the application of nuts, cotter pins, etc. The numeral 11 indicates a suitable supporting structure for the finished panel. In the drawing, a plate is shown provided with a perforation 12. It will be understood however, that the supporting structure for the panels varies widely in form and that the plate-like form illustrated on the drawing is selected merely for purposes of illustration. It will be understood that the rear face of the member 11 is not accessible from the rear face thereof, as above pointed out. For this reason it has been found desirable to employ a headed fastener that has diverging spring arms that engage the sides of the opening 12 in the supporting structure 11 when the fastener is in holding position. One form of such a fastener is illustrated and described in detail in Patent #1,679,266 issued July 31st, 1928. Said fastener is preferably constructed of a single piece of spring wire and is bent between its ends to form a head 13 in the form of a loop, the ends of the loop being bent inwardly towards the center thereof to form arms 14 and 15 (Fig. 1). The free ends of said arms are turned away from the head to together form a shank, that includes a pair of diverging holding portions 16 and 17 and a pair of converging guiding portions 18 and 19. The tips of the converging guiding portions are brought side by side to permit the ready insertion of the shank of the fastener in the perforation 12. It will be readily understood that when the shank of the fastener is inserted in said perforation and pressure is applied endwise of the shank thereof, that the guiding portions 18 and 19 will cause the diverging portions 16 and 17 to be brought toward each other to permit the shank of the fastener to be inserted in said opening. When the fastener is completely inserted the diverging arms spring apart to firmly engage the sides of the perforation as more fully pointed out in the patent above referred to.

In order to anchor the fastener just described to the panel of fibrous material a plate-like member 20, preferably constructed of sheet metal, is provided. Said member may be of any form in outline. In the drawing a circular form is shown. At intervals around the periphery of the member 20, prongs 21 are provided by slitting the metal at a multiplicity of points and bending the resulting tongues inwardly from the body thereof. The body of the member 20 is provided with an opening to permit the ready application of a headed fastener to said member. In the form illustrated on the drawing said opening comprises a T-shaped slot 22, the end of the leg of the T being enlarged as shown at 23. The member 20 just described may, as will be readily understood, be stamped out of a sheet of metal at a single operation and the slot and projections may be provided thereon in the same operation. Said member may accordingly be produced at a very low cost.

The member 20 may also be applied to the fibrous panel by a single pressing operation. The prongs 21 will be caused by such operation to bite into the fibrous material preferably without penetrating through the material as clearly illustrated in Figs. 3 and 6. Sufficient pressure should be applied to cause the prongs to bend and thus clinch the material. In view of the multiplicity of prongs that may be provided around the periphery of the member 20 it will be apparent that the plate will be firmly anchored as just described. It will be readily understood that any number of such plates may be applied to a panel and that they may be positioned either adjacent an edge of the panel, as illustrated on the drawing, or they may be applied at various points of the body thereof substantially spaced from the edges thereof.

The member 20 may be applied to the exposed face of the panel 10 or to the rear face thereof as may be desired. In Figs. 1, 2 and 3 the member 20 is applied to the exposed face of the panel. In this form of the invention the panel is provided with a relatively large perforation 24 approximately registering with the T-shaped slot in the member 20. As clearly shown on the drawing, the plate 20 is then applied with the projections thereof biting into the material around said opening and reinforcing said material at the point that is weakened by said perforation. The formation of circular openings, such as shown at 24, may be effected without the use of expensive dies such as would be required if it were sought to provide the body of the panel with a perforation of relatively complex form, such as the T-shaped perforation in the plate-like member 20. In view of the fact that the fastener is anchored in the plate-like member 20 it is unnecessary that the opening in the panel conform in outline to the opening in the member that covers it. This form of the invention is used when it is unnecessary to conceal the fasteners.

In application, the head of the fastener is inserted in the cross portion of the T-shaped slot in the member 20 with the smaller dimension of the shank in alinement with the narrow portion of the leg of the T-shaped slot. The shank of the fastener is then moved to the enlarged portion of the leg of the T-shaped slot and is turned through an angle of 90°. The fastener is thus firmly anchored to the panel and the panel with the fastener, or a plurality of fasteners applied thereto in the same way may be applied to the supporting structure by simply pressing the fastener or fasteners in the opening or openings provided in the supporting structure to receive them.

If desired, the panel with the member 20 applied thereto as just described may be reversed as shown in Fig. 3A. In this modification of the invention the fastener is applied in the opposite direction and, in assembled relation, the head thereof lies in the opening 24 in the panel. In this construction the head of the fastener does not project above the plane of the exposed face of the trim panel.

Another form of the invention is illustrated in Figs. 4, 5 and 6. In these figures, a construction is shown in which the mode of attachment of the panel is wholly concealed from view and in which the exposed surface of the panel is entirely unperforated, presenting a pleasing effect to the view of the observer. In this form of the invention a sheet metal member 20' is provided, the body of which is provided with a T-shaped slot 22' the leg of T-slot being widened as shown at 23'. The member 20' is provided with prongs or projections 21' designed to bite into the fibrous panel preferably without penetrating completely therethrough. In the respects so far as described the member 20' is the same as the member 20 before referred to. The member 20' differs from the member 20 in that the portion of the body thereof adjacent the leg of the T-shaped slot therein is offset with respect to the edges of the member 20 as shown at 25 to provide room for the head of the fastener between the undersurface of the panel and the inside of the member 20'. The member 20' may be inexpensively produced since the offsetting of the body thereof may be effected in the same stamping operation that produces said member and forms the prongs thereon.

In the application and use of this form of the invention a member or members 20' may be disposed wherever needed and secured to the inner or unexposed face of the panel by pressing the prongs or projections 21' on the members 20' into the fibrous material to cause said prongs to clinch the material. The members 20' are thus firmly anchored to the panel. The headed fasteners may then be applied by inserting them in the T-shaped slot in the manner above described with reference to Figs. 1, 2 and 3. As illustrated in Fig. 6 the head of the fastener lies between the inner surface of the panel and the inner face of the securing plate 20'. The panel with the fasteners held in assembled relation, as just described, may then be applied to the supporting structure by simply firmly pressing the panel with the fasteners attached thereto into the approximately matching openings provided in the supporting structure. The converging guiding portions of the fastener will bring the diverging holding portions sufficiently close together to permit the shank of the fastener to be moved through the openings in said structure. The diverging holding portions of the fastener will then spring apart to engage the sides of the openings and thus firmly hold the panel in place. The fasteners as well as the plates that secure them to the panel are entirely invisible from the exposed surface of the panel.

Reference is made to application Serial No. 294,124 which relates to subject matter similar to that of this application.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What I claim as my invention is:

1. In combination, a supporting structure provided with a perforation, a trim panel lapping said supporting structure and having a perforation approximately in registry with said perforation in the supporting structure, a sheet metal plate bridging said perforation and secured to said panel around the periphery of said plate to stiffen said panel at the point at which said perforation is formed, the body of said plate being provided with an irregular opening shaped to permit application of a fastener to said plate after the latter has been applied to the panel and a headed fastener having a resilient shank formed so as to present a major and minor dimension measured across said shank in different directions said fastener being interlocked in the opening of said plate so that it can not slip therefrom during the application of the panel to the supporting structure and so that the panel can not be shifted with respect to said fastener.

2. The combination defined in claim 1 in which the head of the fastener is disposed in the opening in the panel.

3. A trim panel ready for attachment to a supporting structure comprising a fibrous body provided with a recess, a flat sheet metallic member bridging said recess, means formed as an integral part of said member driven into said body to secure said member thereto and reinforce the same at the point of attachment of a fastener, and a headed spring fastener having its head in the recess in said body and an expansible and contractible shank passing through a hole in the body of said member and consisting of a pair only of relatively movable elements presenting divergently disposed holding surfaces extending away from said member when the fastener is assembled with respect to said member, whereby said body may be drawn closely to a supporting structure when said elements are sprung in a perforation therein.

4. A trim panel ready for attachment to a supporting structure comprising a fibrous body provided with a recess for the reception of the head of a spring fastener, a sheet metallic member for anchoring said fastener to said body extending across and bridging said recess, means formed as an integral part of said member and driven into said body, at opposite sides of said recess to secure said member to said body and to reinforce said body at the point of attachment of said fastener, a hole in said member opposite said recess, a slot in said member of a width less than the diameter of said hole and opening thereinto, and a spring fastener having its head in said recess and comprising a shank extending through said hole, said shank having a major and a minor dimension measured in different directions and being interlocked with said member by disposition of its major dimension across the slot in said member.

5. A trim panel comprising a fibrous body provided with a recess, a sheet metallic member for anchoring a headed spring fastener, comprising a shank having major and minor dimensions measured in different directions, to said body, said member extending across and bridging said recess, means formed as an integral part of said member and driven into said body at opposite sides of said recess to secure said member to said body and to reinforce said body at the point of application of said fastener, and a hole and a communicating slot in said member opposite said recess, said hole having a diameter corresponding approximately to the major dimension of said shank and said slot having a width corresponding approximately to said minor dimension of said shank, whereby said fastener may be interlocked with respect to said member by first passing it through said slot and by then rotating it in said hole.

6. A trim panel, comprising a fibrous body provided with a recess to receive the head of a spring fastener, a sheet metallic member for anchoring said fastener to said body extending across and bridging said recess, means formed as an integral part of said member and driven into said body at opposite sides of said recess to secure said member to said body and to reinforce said body at the point of application of said fastener, and opening to permit the passage of the head of a spring fastener past said member into said recess in the body, a hole in said member and a slot of a width less than the diameter of said hole formed in said member and opening into said hole and opening whereby the shank of a fastener having a major and minor transverse dimension measured in different directions may be shifted through said slot into said hole by disposing said shank so that the major dimension thereof extends along said slot and whereby said fastener may be interlocked with said member by rotation thereof in the hole until the major dimension thereof extends across said slot.

7. The method of preparing a trim panel for attachment to the supporting structure of the interior of an automobile body or the like, which consists in attaching small plate like sheet metallic fastener anchoring elements to the foundation or body at the points at which the fasteners are to be applied, and then interlocking spring fasteners to said elements with their shanks protruding away from the panel so that the fasteners will remain in position for subsequent application of said shanks to openings in said supporting structure.

8. A trim panel ready for attachment to a supporting structure comprising the foundation or body of the panel, a fastener anchoring element in the form of a small sheet metallic plate applied to said foundation or body at the point where a fastener is to be employed to secure the panel in place, and a spring fastener interlocked with respect to said element after application of the latter to said foundation or body with its shank protruding away from said element, the interlock between the fastener and element preventing ready disassembly of the fastener and element during application of the panel to the supporting structure.

9. A fastener for detachably securing a pair of members together comprising a fastener element having outwardly bowed leg portions insertable within an opening formed in one of said members and engageable with the side walls of the opening to maintain the element in assembled relation with the said member, said leg portions terminating in oppositely extending attaching portions, means for removably securing said fastener element to another of said members comprising a retainer plate secured to the latter member and having a portion spaced laterally from the adjacent face of the last-mentioned member for slidably receiving the attaching portions aforesaid, said laterally spaced portion having an irregular slot therein through one part of which the leg portions of the fastener element may be passed and within another part of which the leg portion of said element may be interlocked with respect to said retainer plate.

10. Fastener means for detachably securing a pair of members together comprising a fastener element having outwardly bowed leg portions insertable within an opening formed in one of said members and engageable with the side walls of the opening to maintain the element in assembled relation with the said member, said leg portions terminating in oppositely extending attaching portions, means for removably securing said fastener element to another of said members comprising a retainer plate secured to the latter member and having a portion spaced laterally from the adjacent face of the last-mentioned member for slidably receiving the attaching portions aforesaid, said laterally spaced portion of the retainer plate having a slot therein through which the leg portions of the fastener element project and having a second slot extending transversely to the slot aforesaid and opening into the latter slot permitting the fastener element to be assembled with and removed from the retainer plate.

BION C. PLACE.